Aug. 15, 1939.   F. H. MUELLER   2,169,810
LUBRICATED VALVE
Filed Sept. 16, 1937

Inventor
Frank H. Mueller

Patented Aug. 15, 1939

2,169,810

UNITED STATES PATENT OFFICE 2,169,810

LUBRICATED VALVE

Frank H. Mueller, Decatur, Ill., assignor to Mueller Co., Decatur, Ill., a corporation of Illinois Application September 16, 1937, Serial No. 164,231

2 Claims. (Cl. 251—93)

The present invention relates to lubricated valves of the plug type and has as a main object to provide a valve of the said type with a system affording great completeness of lubrication while preventing, as far as possible, the loss of lubricant during manipulation of the valve.

Since the invention will be best understood by reference to a practical embodiment thereof, I shall proceed to describe the invention in connection with the accompanying drawing which shows an illustrative embodiment. In the drawing.

Figures 1, 2, 3, 4, 5, 6:
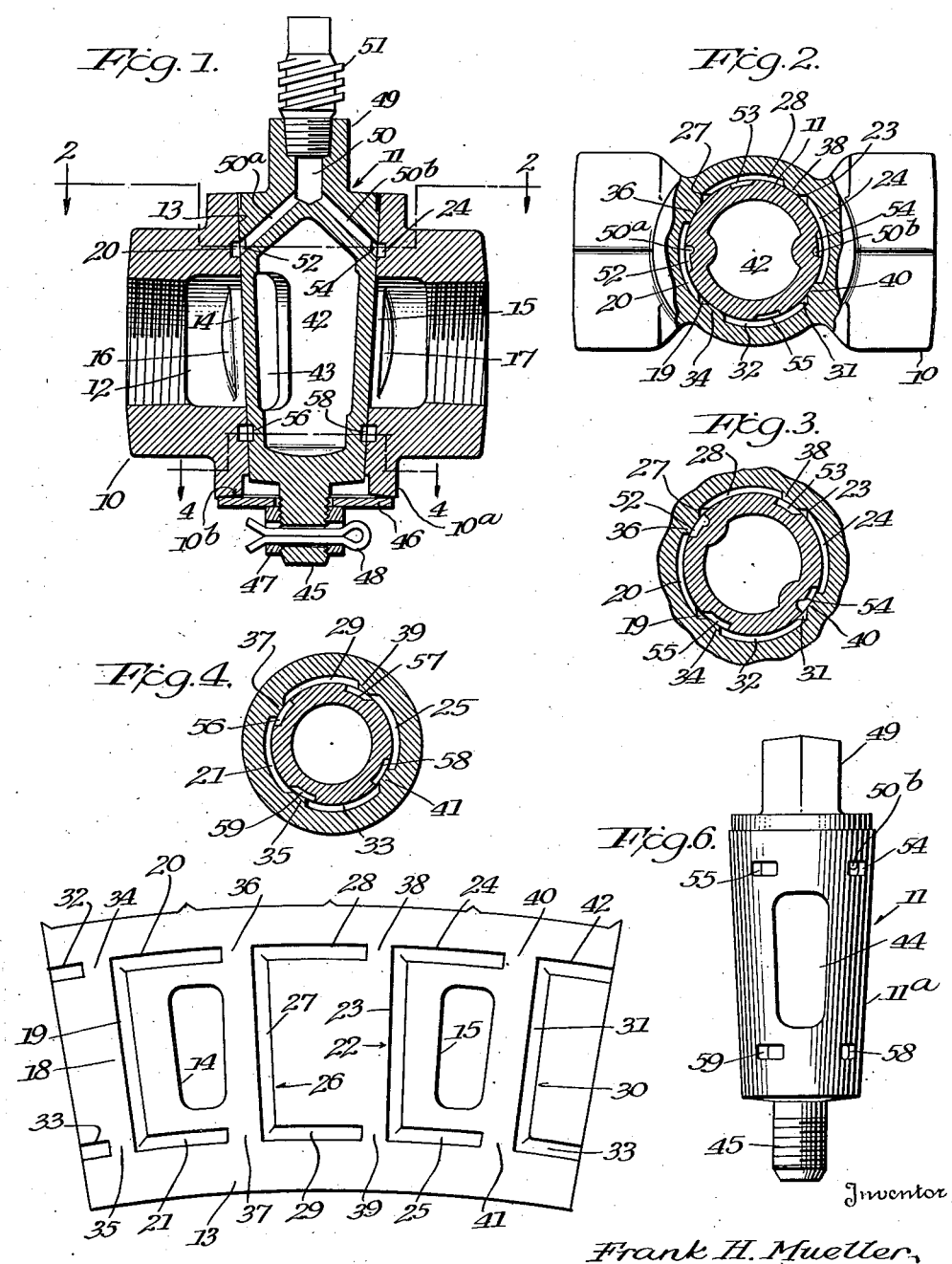
Figure 1 is an axial section of a valve having the lubricating provisions of the present invention, the plug being shown half way between open and closed positions.
Figure 2 is a section substantially on the line 2—2 of Figure 1.
Figure 3 is a partial section on the section line of Figure 2 but showing the plug in what may be taken as either open or closed position.
Figure 4 is a section on line 4—4 of Figure 1, but with the plug assumed to be in the position shown in Figure 3.
Figure 5 is a developed view of the valve seat.
Figure 6 is an elevation of the valve plug.

Referring to the drawing, reference numeral 10 designates generally the valve body and reference numeral 11 the valve plug, and these elements may be generally of any usual design.

As here shown, the body 10 has a through passage 12 which may be threaded at its ends to receive the threaded ends of suitable pipe sections or other fittings. Extending transversely of the passage 12 is a slightly conical or tapered valve seat 13. The seat is provided with ports 14 and 15 defined laterally by axially extending ribs as at 16 and 17.

The port 14 is encompassed on three sides by a groove generally indicated at 18, this groove comprising a portion 19 extending longitudinally of the seat and transversely extending portions 20 and 21 merging with the ends of portion 19. Port 15 is similarly encompassed by a groove 22 comprising the portions 23, 24 and 25.

Between the grooves 18 and 22 is a groove 26 of similar extent and comprising the portions 27, 28 and 29, and opposite the groove 26 is an identical groove 30 constituted by the portions 31, 32 and 33.

The upper groove portions all lie in a plane normal to the plug axis and the lower groove portions lie in a common plane parallel to the first. The longitudinally extending groove portions are spaced 90° apart and disposed as elements of the conical seat. Lands 34, 35; 36, 37; 38, 39; and 40, 41 separate the vertical groove portions from the ends of the horizontal portions of the adjacent grooves.

Referring to port 14, the groove portions 19 and 27 are equidistantly spaced from the sides thereof and the groove portions 20 and 21 are equidistantly spaced from the ends thereof, as here shown. The port is substantially surrounded by the groove 18 and the groove portion 27. Similarly, port 15 is substantially surrounded by the groove 22 and the groove portion 31. Groove 26, together with groove portion 23, and groove 30 together with groove portion 19 constitute similar substantially encompassing channels for the bounded areas.

The plug 11 comprises a tapered portion 11a cooperative with the seat 13. It is provided with a transversely extending passage 42 with the ports 43, Figure 1, and 44, Figure 6. In the open position of the valve the plug ports register with the seat ports while in the closed position, which is 90° from the open position, the plug ports are closed by the solid side walls of the seat. At its lower end, the plug has a projecting stud 45 which is passed through a retaining washer 46 and has threaded thereon a crenelated nut 47 which is locked by a cotter 48. At its other end the plug has an axial stem 49 provided with an axial bore 50 which at its enlarged upper end is internally threaded to receive a grease gun coupling 51 provided with the usual check valve. Stem 49 is shaped to be gripped by a wrench or the like.

Formed in the upper portion of the plug in a common plane normal to the plug axis are four slightly circumferentially elongated recesses 52, 53, 54 and 55, these being at 90° intervals and in the assembled valve lying in the plane of the upper transverse groove portions. Similarly formed in the lower portion of the plug are the recesses or grooves 56, 57, 58 and 59, all of which, as here shown, are blind. The recesses of the lower group are spaced 90° apart and lie in the same elements of the cone as the recesses of the upper group. With the valve parts assembled, they are in the plane of the lower transverse groove portions of the valve seat.

The transverse extent of the upper plug recesses is such that in either fully open or fully closed position of the plug they will bridge or span the top group of lands so that the upper transversely extending groove portions will all be connected together through the plug recesses. Interconnection of the lower transverse groove portions will be similarly effected by the lower group of plug recesses.

The bore 50 of the plug stem is connected by ducts 50a and 50b with the opposed recesses 52 and 54 of the plug, recesses or grooves 53 and 55 being blind. Consequently, with the plug in either fully open or fully closed position, lubricant supplied through the fitting 51 will be communicated through the ducts 50a and 50b and the various plug recesses to fill the entire groove system of the valve seat. It follows also that in either fully open or fully closed position of the plug the ports of the plug are each entirely surrounded by a lubricant channel charged with lubricant under pressure and this is of great advantage in assuring easy operation of the valve plug from either position to the other.

In Figures 3 and 4 the plug is assumed to be in closed position. In rotating the plug, say in a clockwise direction, toward open position, the trailing edges of the plug recesses will come over the adjacent lands just prior to the time the plug ports are at all uncovered. Thus by the time flow is permitted the grooves 18 and 22 which surround the seat ports are out of communication with the plug recesses 52 and 54 so that there can be no loss of pressure in the system as the valve ports pass the groove portions 19 and 23. However, by the time fully open position has been reached the supply ports 52 and 54 are in bridging relation to the lands at 90° from their original position and the entire system is again under pressure. The same sequence occurs upon closing movement of the plug.

The grooves are readily formed in the valve body seat in a casting operation and require no machining. Furthermore, the plug recesses may be cut by one contact with a milling cutter so that the new valve, in addition to being efficient in operation, may be most economically manufactured.

Referring to Figure 1, it will be noted that the cylindrical neck 10a at the bottom of the housing has a slightly dished or conical annular rim 10b concentric with and surrounding the stud 45. The washer 46 is of spring material, such as phosphor bronze or steel, and normally, its edge makes a line contact with the surface of rim 10b, as shown, the plug being thus normally yieldingly seated. However, due to the springiness of the washer 46, the plug may rise slightly relative to its seat, the rise being arrested when the face of the washer adjacent the rim comes into full engagement with the surface of the latter. This preferred arrangement is advantageous in that the plug is maintained seated under spring force but is permitted to rise slightly to enable it to be easily turned, the rise of the plug being limited in the manner described.

It will be understood that the invention, in its embodiment, may vary from the specific form and arrangement of parts herein disclosed by way of example, and that accordingly I do not limit myself in these respects except as in the following claims.

I claim:
1. A valve comprising a housing having a tapered seat therein provided with opposite lateral ports for passing flow through the body, and a tapered rotary plug cooperative with said seat, said plug having a transverse flow passage and having open and closed positions relative to said ports, said seat having longitudinally extending grooves spaced at 90° intervals and symmetrically arranged with respect to said ports, said seat also having two parallel series of arcuate grooves, each of said longitudinally extending grooves having its ends in connection with an arcuate groove of each of said series and the arcuate grooves of each of said series lying in the same plane normal to the plug axis and having their ends equi-distantly spaced from each other so that lands are present between the grooves of each of said series, said plug having a series of external grooves which in the open and closed positions of the plug bridge the lands between the grooves of one of said series of arcuate grooves so that the last named grooves are in communication with each other, and lubricant ducts in said plug leading to opposite ones of said series of external grooves, said opposite ones of said grooves moving out of communication with the associated arcuate grooves which are in connection with the longitudinally extending grooves toward which the ends of the plug passage move when the plug is turned, the remainder of the plug grooves being blind.

2. A valve comprising a housing having a tapered seat therein provided with opposite lateral ports for passing flow through the body, and a tapered rotary plug cooperative with said seat, said plug having a transverse flow passage and having open and closed positions relative to said ports, said seat having longitudinally extending grooves spaced at 90° intervals and symmetrically arranged with respect to said ports, said seat also having two parallel series of arcuate grooves, each of said longitudinally extending grooves having its ends in connection with an arcuate groove of each of said series and the arcuate grooves of each of said series lying in the same plane normal to the plug axis and having their ends equidistantly spaced from each other so that lands are present between the grooves of each of said series, said plug having axially spaced series of external grooves which in the open and closed positions of the plug bridge said lands so that all of the seat grooves are in communication with each other, and lubricant ducts in said plug leading to opposite ones of the grooves of one of said series of external grooves, said opposite ones of said grooves moving out of communication with the associated arcuate grooves which are in connection with the longitudinally extending grooves toward which the ends of the plug passage move when the plug is turned, the remainder of the plug grooves being blind.

FRANK H. MUELLER.